US010693855B1

(12) United States Patent
Kolman et al.

(10) Patent No.: US 10,693,855 B1
(45) Date of Patent: Jun. 23, 2020

(54) FRAUD DETECTION

(71) Applicant: EMC Corporation, Hopkinton, MA (US)

(72) Inventors: Eyal Kolman, Raanana (IL); Carmit Sahar, Tel Aviv (IL)

(73) Assignee: EMC IP Holding Company LLC, Hopkinton, MA (US)

(*) Notice: Subject to any disclaimer, the term of this patent is extended or adjusted under 35 U.S.C. 154(b) by 194 days.

(21) Appl. No.: 15/086,315

(22) Filed: Mar. 31, 2016

(51) Int. Cl.
H04L 29/06 (2006.01)
(52) U.S. Cl.
CPC .............. *H04L 63/08* (2013.01); *H04L 63/20* (2013.01)
(58) Field of Classification Search
CPC .................................. H04L 63/08; H04L 63/20
See application file for complete search history.

(56) References Cited

U.S. PATENT DOCUMENTS

| 8,813,237 | B2* | 8/2014 | Amit ...................... G06F 21/31 |
| | | | 709/223 |
| 10,510,078 | B2* | 12/2019 | Le ........................ G06Q 20/401 |
| 2009/0030756 | A1* | 1/2009 | Riley .................... G06Q 10/063 |
| | | | 705/7.11 |
| 2010/0051684 | A1* | 3/2010 | Powers .............. G06Q 20/4016 |
| | | | 235/379 |
| 2010/0057614 | A1* | 3/2010 | Rainey .................. G06Q 20/10 |
| | | | 705/42 |
| 2012/0023567 | A1* | 1/2012 | Hammad ............... G06Q 20/12 |
| | | | 726/9 |
| 2012/0157042 | A1* | 6/2012 | McCanna ........... H04L 12/1414 |
| | | | 455/407 |
| 2012/0278249 | A1* | 11/2012 | Duggal .................. G06Q 40/08 |
| | | | 705/325 |
| 2015/0379517 | A1* | 12/2015 | Jin ...................... G06Q 20/4016 |
| | | | 705/44 |
| 2016/0087957 | A1* | 3/2016 | Shah ..................... H04L 63/205 |
| | | | 726/1 |
| 2017/0148024 | A1* | 5/2017 | Yu ....................... G06Q 20/4016 |
| 2018/0026976 | A1* | 1/2018 | White ................... H04L 9/3231 |

* cited by examiner

*Primary Examiner* — Abu S Sholeman
(74) *Attorney, Agent, or Firm* — Krishnendu Gupta; Nikhil Patel

(57) ABSTRACT

There are disclosed herein techniques for use in fraud detection. In one embodiment, there is disclosed a technique comprising receiving a request to authenticate an electronic transaction described by a particular value of an authentication factor. The technique also comprises analysing transaction data relating to prior electronic transactions to determine information in connection with the particular value of the authentication factor. The analysing comprising a first part and a second part that separately analyse transaction data relating to at least one prior electronic transaction such that one of the first and second parts distinguishes itself from the other of the first and second parts by the extent to which that one part discriminates against the at least one prior electronic transaction based on its age. The technique further comprising determining riskiness in connection with the transaction based on the information and generating, based on the information, an authentication result that indicates whether the transaction is authentic.

15 Claims, 5 Drawing Sheets

PRIOR TRANSACTION DATA 172

| USER ID | DATE/TIME | CATEGORY VALUE |
|---------|-----------------|----------------|
| 00101   | 2016-01-23 10:45 | 14 |
| 00123   | 2016-01-23 10:47 | 5  |
| 00126   | 2016-01-23 11:42 | 7  |
| 00054   | 2016-01-23 11:46 | 14 |
| ...     | ...             | ... |

FIG. 2

FRAUD DETECTION

TECHNICAL FIELD

The present invention relates generally to fraud detection. More specifically, the present invention relates to a method, an apparatus and a computer program product for use in authenticating electronic transactions.

BACKGROUND OF THE INVENTION

Many fraud detection systems authenticate a transaction based on a risk score. These systems, typically, comprise a risk engine that generates, as the risk score, a numerical value from an evaluation of current factors in connection with the transaction. For example, the factors may relate to the time of the transaction, location from which the transaction emanated, etc. If the risk engine determines that these current factors deviate from factors relating to previous transactions then a high risk score may be generated indicative of a high risk in connection with the transaction. Conversely, if the risk engine determines that these current factors are consistent with factors relating to previous transactions then a low risk score may be generated indicative of a low risk in connection with the transaction.

Additionally, in order to handle legitimate behavioural changes, the above type of fraud detection systems constantly learns new behavioural patterns and forgets older ones. As will be appreciated, it is desirable in general to learn these changes in behavioural patterns fast such that the system does not issue alerts in connection with authentic transactions. However, there exists a problem with this approach in that the learning rate for learning new behavioural patterns is similar to the forgetting rate (i.e., the faster you learn, the faster you forget). Unfortunately, this leads to many false alerts being issued in connection with authentic transactions.

A need, therefore, exists for further improved techniques for use in authenticating transactions.

SUMMARY OF THE INVENTION

There is disclosed a computer-implemented method, comprising: receiving, by processing circuitry, a request to authenticate an electronic transaction, the electronic transaction being described by a particular value of an authentication factor; analysing, by the processing circuitry, transaction data relating to prior electronic transactions to determine information in connection with the particular value of the authentication factor, the analysing comprising a first part and a second part that separately analyse transaction data relating to at least one prior electronic transaction such that one of the first and second parts distinguishes itself from the other of the first and second parts by the extent to which that one part discriminates against the at least one prior electronic transaction based on its age;

determining, by the processing circuitry, a riskiness in connection with the electronic transaction based on the information in connection with the particular value of the authentication factor; and generating, by the processing circuitry, an authentication result based on the riskiness, the authentication result indicating whether the electronic transaction is authentic.

There is also disclosed an apparatus, comprising: memory; and processing circuitry coupled to the memory, the memory storing program code which, when executed by the processing circuitry, cause the processing circuitry to: receive a request to authenticate an electronic transaction, the electronic transaction being described by a particular value of an authentication factor; analyse transaction data relating to prior electronic transactions to determine information in connection with the particular value of the authentication factor, the analysing comprising a first part and a second part that separately analyse transaction data relating to at least one prior electronic transaction such that one of the first and second parts distinguishes itself from the other of the first and second parts by the extent to which that one part discriminates against the at least one prior electronic transaction based on its age; determine a riskiness in connection with the electronic transaction based on the information in connection with the particular value of the authentication factor; and generate an authentication result based on the riskiness, the authentication result indicating whether the electronic transaction is authentic.

There is further disclosed a computer program product having a non-transitory computer readable medium which stores a set of instructions, the set of instructions, when carried out by processing circuitry, causing the processing circuitry to perform a method, the method comprising: receiving a request to authenticate an electronic transaction, the electronic transaction being described by a particular value of an authentication factor; analysing transaction data relating to prior electronic transactions to determine information in connection with the particular value of the authentication factor, the analysing comprising a first part and a second part that separately analyse transaction data relating to at least one prior electronic transaction such that one of the first and second parts distinguishes itself from the other of the first and second parts by the extent to which that one part discriminates against the at least one prior electronic transaction based on its age; determining a riskiness in connection with the electronic transaction based on the information in connection with the particular value of the authentication factor; and generating an authentication result based on the riskiness, the authentication result indicating whether the electronic transaction is authentic.

BRIEF DESCRIPTION OF THE DRAWINGS

The invention will be more clearly understood from the following description of preferred embodiments thereof, which are given by way of examples only, with reference to the accompanying drawings, in which:

FIG. 2 is a block diagram illustrating an example set of prior transaction data within the electronic environment illustrated in FIG. 1.

DETAILED DESCRIPTION

Figure 1:
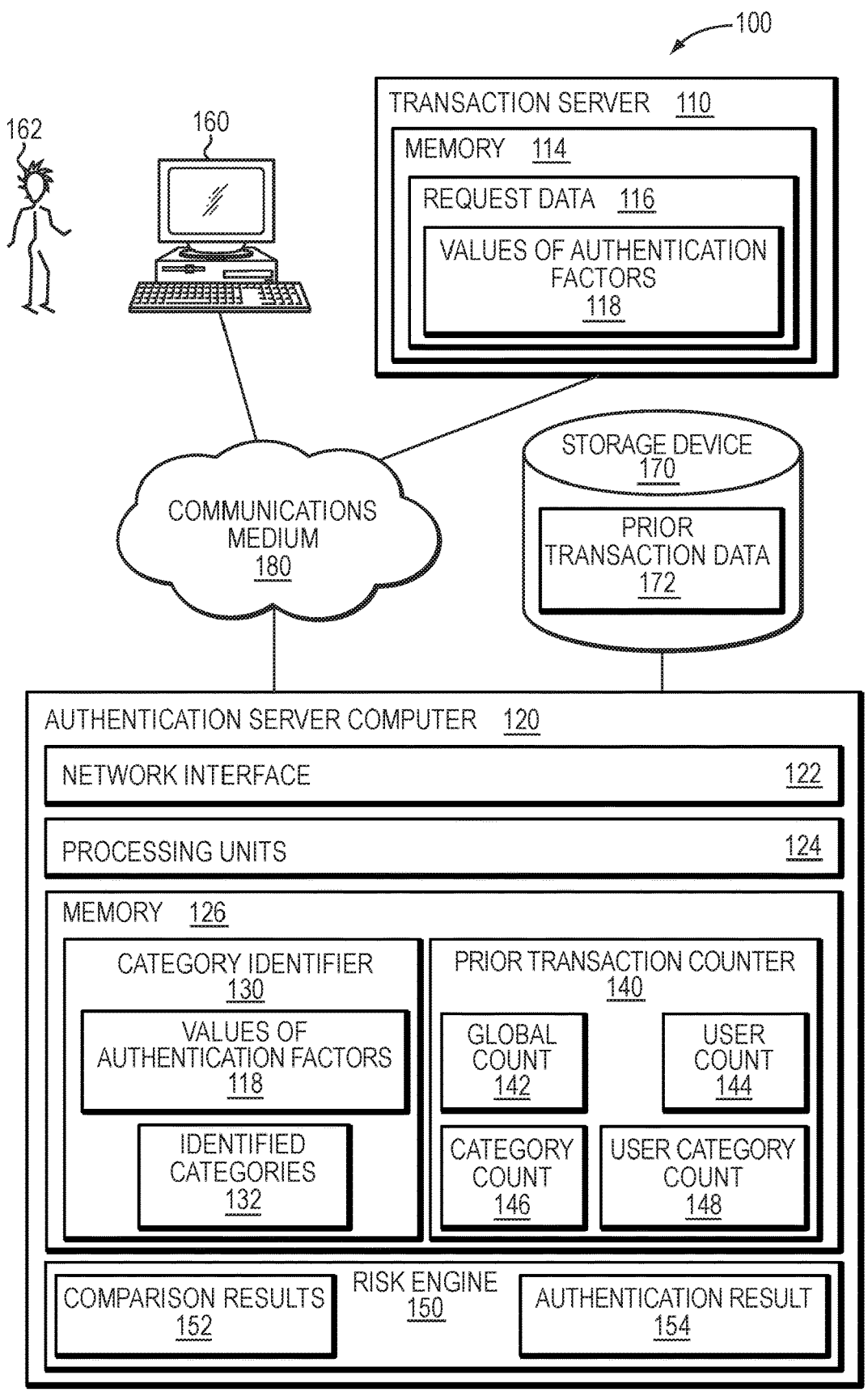
FIG. 1 is a block diagram illustrating an example electronic environment in which the improved technique can be carried out.

FIG. 1 shows an example electronic environment 100 in which embodiments of the improved techniques can be practiced. The electronic environment 100 includes a transaction server 110, an authentication server computer 120, a storage device 170, and communications medium 180.

Transaction server 110 is constructed and arranged to receive requests to carry out a transaction from electronic devices (e.g., user computer 160) connected to communications medium 180. Transaction server 110 is also constructed and arranged to send transaction data to authentication server computer 120. Transaction server 110 is typically a large server or set of servers in a data center that processes high volumes of transactions. As illustrated in FIG. 1, transaction server 110 includes a memory 114 that contains data 116 from a request. The request data 116 includes values of authentication factors 118 that will define a value of a category.

The authentication server computer 120 is constructed and arranged to receive request data 116 including the values of authentication factors 118 from the transaction server 110. From these values, the authentication server computer 120 is constructed and arranged to generate an authentication result. As illustrated in FIG. 1, the authentication server computer 120 includes a network interface 122, a processor 124, and memory 126. The network interface 122 includes, for example, adapters, such as SCSI target adapters and network interface adapters, for converting electronic and/or optical signals received from the communications medium 180 to electronic form for use by the authentication server computer 120. The processor 124 includes one or more processing chips and/or assemblies. In a particular example, the processor 124 includes multi-core CPUs. The memory 126 includes both volatile memory (e.g., RAM), and non-volatile memory, such as one or more ROMs, disk drives, solid state drives, and the like. The processor 124 and the memory 126 together form control circuitry, which is constructed and arranged to carry out various functions as described herein.

The memory 126 is also constructed and arranged to store various data, for example, values of authentication factors 118, identified categories 132, global count 142, user count 144, category count 146, user category count 148, comparison results 152, and authentication result 154. The memory 126 is further constructed and arranged to store a variety of software constructs realised in the form of executable instructions, such as a category identifier 130, prior transaction counter 140, and risk engine 150. When the executable instructions are run by the processor 124, the processor 124 is caused to carry out the operations of the software constructs. Although certain software constructs are specifically shown and described, it should be understood that the memory 126 typically includes many other software constructs, which are not shown, such as an operating system, various applications, processes, and daemons, for example.

The values of the authentication factors 118 describe the request received from a user 162 on an electronic device 160. For example, authentication factors may include an IP address from which the request originated, a time at which the request was sent from the device 160, and a country of origin.

The identified categories 132 represent specified ranges of values of authentication factors 118. A category describes a transaction and has a set of values. For example, a category may simply be one of the authentication factors, such as country of origin. In that case, the value of the category 132 is simply the value of that authentication factor 118. However, in some arrangements a category may be a combination of authentication factors, with each value of that category being a combination of possible values of those factors.

The global count 142 represents a count of all prior transactions (i.e., across a population of users) within a specified time period (e.g., 1 month). The user count 144 represents a count of the prior transactions within the specified time period that involve a specific user 162 that sent the request to the transaction server 110. The category count 146 represents a count of the prior transactions within the specified time period described by a particular value of a category. The user category count 148 represents a count of the prior transactions within the specified time period that involve the specific user and are described by the particular value of the category.

The category identifier 130 identifies values of categories 132 given values of authentication factors 118. The prior transaction counter 140 accesses prior transaction data 172 stored in storage device 170 and counts the prior transactions that satisfy specified constraints (e.g., transactions from a specified user, described by a certain category value, etc.).

The risk engine 150 produces an authentication result 154 from the counts 142, 144, 146, and 148. In some arrangements, the risk engine 150 produces comparison results 152, for example a ratio of count 146 to count 142. The risk engine 150 then computes a risk score based on comparison results 152.

The storage device 170 is connected to the authentication server computer 120 and stores prior transaction data 172. The prior transaction data 172 includes records of all prior transactions within a specified time period.

FIG. 2 illustrates an example set of prior transaction data 172. In this example, the prior transaction data 172 has only three fields: a user ID field identifying a user in a population of users, a date/time field and a category value field.

Returning to FIG. 1, the communications medium 180 provides network connections among the transaction server 110 and the authentication server computer 120.

Communications medium 180 may implement any of a variety of protocols and topologies that are in common use for communications over the Internet. Furthermore, communications medium 180 may include various components (e.g., cables, switches/routers, gateways/bridges, etc.) that are used in such communications.

During operation, the user 162 sends a request to process a transaction via device 160 to transaction server 110. For example, the user may be attempting to make a credit card purchase at an online merchant. In response, the transaction server 110 generates a request to authenticate the transaction. In doing so, the transaction server 110 sends the authentication factor values 118 to the authentication server computer 120.

Upon receiving the authentication factor values 118, the authentication server computer 120, via the category identifier 130, determines a value of a category 132 to which the transaction belongs.

Once the value of the category 132 has been found and stored in memory 126, the authentication server computer 120, via the prior transaction counter 140, accesses the storage device 170 to perform query operations on the prior transaction data 172. For example, the authentication server computer 120 counts the number of prior transactions within a specified time period, independent of user or category value, to produce the global count 142. In addition, the authentication server computer 120 counts the number of prior transactions within the specified time period that were requested by the specific user 162 to produce the user count 144. Further, the authentication server computer 120 counts the number of prior transactions within the specified time period that were described by the value of the category 132 to produce the category count 146. Finally, the authentication server computer 120 counts the number of prior transactions within the specified time period that were requested by the specific user 162 and were described by the value of the category 132 to produce the user category count 148.

Once these four counts 142, 144, 146, and 148 have been derived, the authentication server computer 120 via the risk engine 150 may determine whether the transaction is authentic. Further details about how the risk engine may make this determination are described in more detail with regard to FIG. 3.

Figure 3:
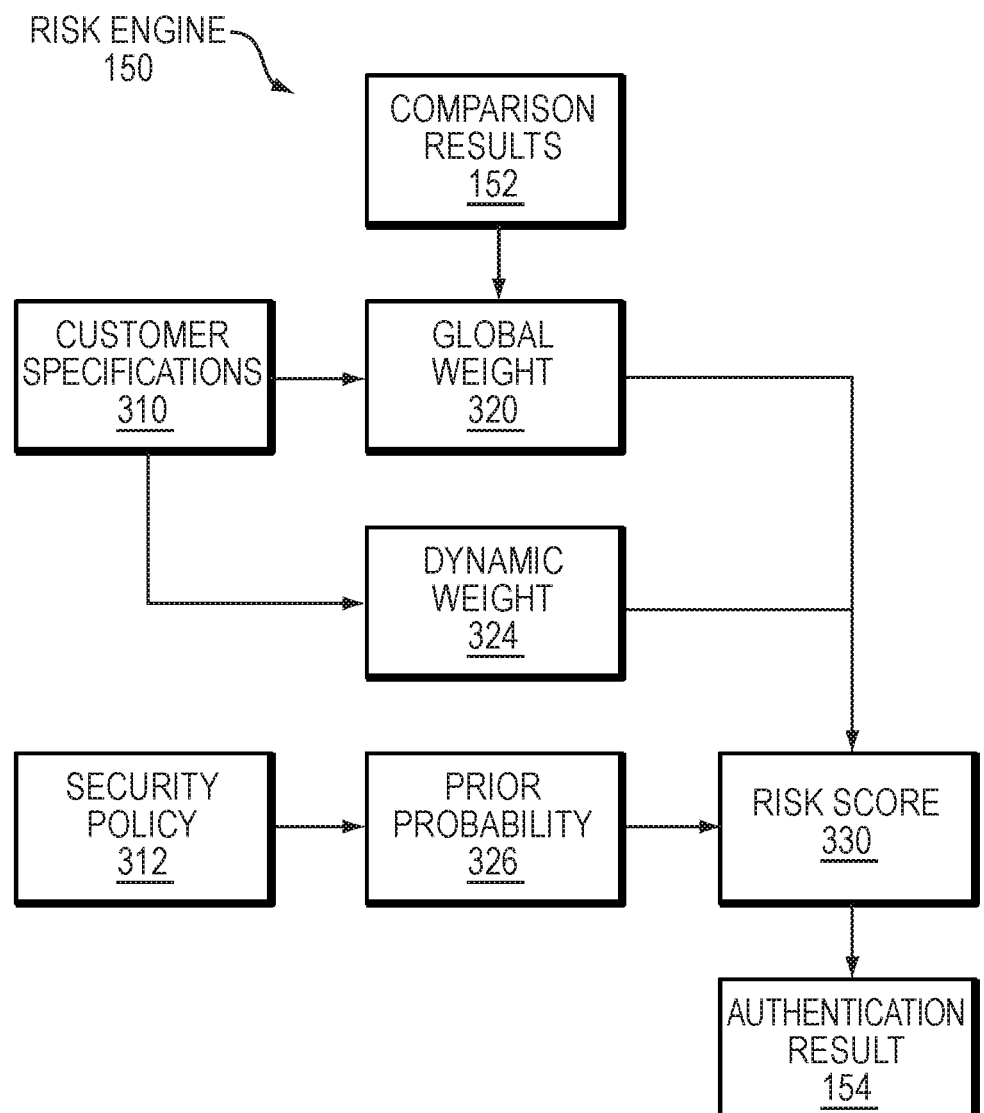
FIG. 3 is a block diagram illustrating an example process of computing a risk score within the electronic environment illustrated in FIG. 1.

FIG. 3 illustrates an example process carried out by the risk engine 150 to determine the authentication result 154 from the counts 142, 144, 146, and 148.

For the following discussion, the user category count 148 is denoted as $N_{C_i}^u$, where $C_i$ denotes the category value 132 stored in memory 126, and u denotes the specified user. Also denote the category count 146 as:

$$N_{C_i} = \sum_u N_{C_i}^u,$$

the user count 144 as:

$$N^u = \sum_{C \in C_i} N_{C_i}^u,$$

and the global count 142 as:

$$N = \sum_u \sum_{C \in C_i} N_{C_i}^u.$$

That is, the category count 146 is a sum of user category counts over all users, the user count 144 is a sum of user category counts over all category values of the category, and the global count 142 is a sum over both all users and all category values of the category.

The risk engine forms the comparison results 152 by computing ratios of the above counts. For example, the risk engine 150 computes a probability of a prior transaction being described by the category value $C_i$ as:

$$P_A(C_i) = \frac{N_{C_i}}{N}.$$

The risk engine 150 also computes a conditional probability of a prior transaction being described by the category value $C_i$ given that the prior transaction was initiated by the specific user u as:

$$P(C_i | u) = \frac{N_{C_i}^u}{N^u}.$$

However, it should be understood that a risk score that indicates the riskiness of the transaction should be higher when the transaction being described by the category value $C_i$ is an anomaly. That is, the risk score is more directly a function of:

$$P_A(\overline{C_i}) = 1 - \frac{N_{C_i}}{N}$$

and $$P(\overline{C_i} | u) = 1 - \frac{N_{C_i'}^u}{N^u}.$$

The risk score, which is denoted by $R_{C_i}^u$, is a weighted sum of $P_A(\overline{C_i})$ and $P(\overline{C_i}|u)$. There are two weights used to tune the behaviour of the risk score. The weights are a global weight 320 and a dynamic weight 324. The global weight 320, denoted by $\beta_C$, tunes the emphasis given the global vs. the user-specific contributions to the risk score. The dynamic weight 324, denoted by $\gamma_C$, tunes the emphasis given to a dynamic vs. static contribution to the risk score.

It should be understood that the global weight 320 and the dynamic weight 324 are typically derived from customer specifications 310, e.g., as part of a Service Level Agreement. The customer specifications 310 are documents specifying the types of results expected by the customer, i.e., the transaction server 110. In some arrangements, the global weight 320 and the dynamic weight 324 may be specified directly in this document. In other arrangements, the global weight 320 and the dynamic weight 324 are deduced automatically (e.g., by the authentication server computer) from specific language in the document.

Further, the risk engine 150 also receives a static, prior probability 326, denoted as $P_{C_i}^0$. This prior probability 326 represents the likelihood that any transaction at any time, even outside of the time window. (It should be understood that other, dynamic probabilities assume that the transactions considered are within a specified time window.) This prior probability 326 may be computed from other, external transaction data. However, in some arrangements, the prior probability 326 may be derived from a security policy 312 that specifies a desired fraction of transactions that are not to be authenticated.

The risk score 320 is then computed according to the following expression:

$$R_{C_i}^u = \beta_c[1 - \gamma_c P_A(c_i) - (1-\gamma_c)P_{c_i}^0] + (1-\beta_c)(1-P(c_i|u))$$

It should be appreciated that the risk score as expressed in the above model is a self-updating expression because it depends on the self-updating prior transaction data 172. After a new transaction is to be assessed for risk, the transaction data is stored with the other prior transaction data 172. Thus, subsequent transactions will have risk scores computed based on the current transactions. Further, as the transaction data is taken from a specified time window, stale data is removed from consideration.

It should be further understood that it is desirable in at least some embodiments to apply aging to the event counts to allow the system to adapt over time. Aging effectively provides a higher weighting of more recent events than more distant events in the past. In one embodiment an exponential decay maybe employed for aging. The estimation of the total number of events in a window-time d at time t is given by the recursive relation:

$$N^{(t)} = \eta^{(t_k)} + \alpha^{\Delta t} N^{(t-\Delta t)},$$

where $N^{(t-\Delta t)}$ denotes the value of the last update of the number of events estimate that took place at time $(t-\Delta t)$ and $\eta^{(t_k)}$ is the event weight of the $k^{th}$ transaction. In the simple counting scenario, all $\eta$ values equal 1. The decay factor is given by:

$$\alpha = \exp^{-1/d}$$

This expression is valid under the assumption of continuous time. In the case it is discrete, the decaying factor becomes:

$$\alpha = \frac{d-1}{d}$$

Theoretically, regarding initial values, the initial counter value should be zero (i.e. $N^{(t=0)}=0$). At a constant event rate (i.e., $\Delta t$=const) with exponential weighting, the counter value approaches an asymptote:

$$\lim_{t\to\infty} N^{(t)} = \lim_{t\to\infty} \frac{(\alpha^{\Delta t})^t - 1}{\alpha^{\Delta t} - 1} = \frac{1}{1 - \alpha^{\Delta t}}$$

The time it takes to get to the asymptote depends on the event rate and on a. It can be shortened by setting $N^0 \leftarrow N^{(t=0)} = (1-\alpha^{\Delta t})^{-1}$. The source of this parameter can be a result of some preliminary study (for example: average number of logins in a certain period of time), theoretical analysis of a suggested model (for example: expected event rate at equilibrium) or corresponding N value from the same model applied on a different instance (for example: values from model acting on Bank A transferred to Bank B). Thus, a model that is based on these counters is expected to show reasonable performance immediately, without waiting for counter values to reach operational values. At the same time, the use of aging also ensures model accommodation to user and corporate history and that any incorrectly assigned initial values will eventually fade out and not interfere with model performance.

Regarding explicit evolution equations, the recursive expression can be written explicitly as:

$$N^{(t)} = \sum_{k\geq 1} \alpha^{t-t_k} \eta^{(t_k)} + N^0 \alpha^{t-t_1},$$

where $t_k$ is the time-stamp of the $k^{th}$ transaction; $t_1$ is the time stamp of first appearance.

Regarding asynchronous calculation, a possible scenario that should be addressed is batch learning where a batch file is used to train the system post factum. The update in this case is as follows:

$$N^{(t^l)} = \sum_{k\geq 1} \alpha^{t^l-t_k} \eta^{(t_k)} + \alpha^{t^l-t} N^{(t_k)},$$

where $t^l$ is the learning time the maximum time among all the known transactions.

Figure 4:
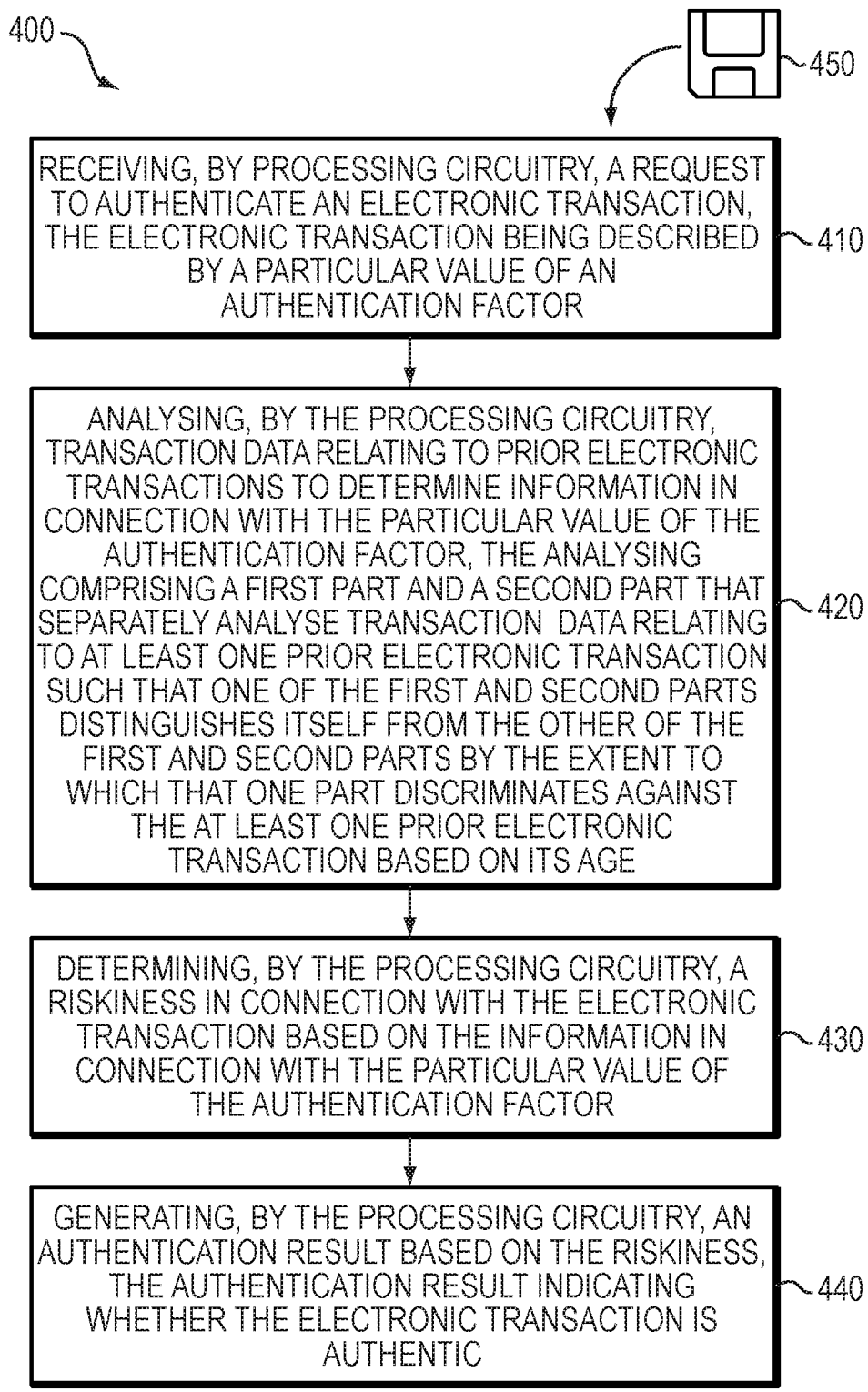
FIG. 4 is a flow chart illustrating a method of carrying out the improved technique within the electronic environment illustrated in FIG. 1.

FIG. 4 illustrates a method 400 of authenticating an electronic transaction. The method 400 may be performed by the software constructs described in connection with FIG. 1, which reside in the memory 126 of the authentication server computer 120 and are run by the processing units 124. At step 410, a request to authenticate an electronic transaction is received, the electronic transaction being described by a particular value of an authentication factor. For example, the authentication server computer 120 receives, within a request to authenticate a transaction, values of authentication factors describing the transaction. At step 420, transaction data relating to prior electronic transactions is analysed to determine information in connection with the particular value of the authentication factor. Here, the analysing comprising a first part and a second part that separately analyse transaction data relating to at least one prior electronic transaction such that one of the first and second parts distinguishes itself from the other of the first and second parts by the extent to which that one part discriminates against the at least one prior electronic transaction based on its age. At step 430, a riskiness in connection with the electronic transaction is determined based on the information in connection with the particular value of the authentication factor. In some arrangements, the riskiness as determined is represented by a risk score 330 that is computed as described above. At step 440, an authentication result is generated based on the riskiness, the authentication result indicating whether the electronic transaction is authentic.

As described above, the method 400 may be performed by the software constructs residing in the memory 126 of the authentication server computer 120 and run by the processing units 124. In one particular example embodiment, the authentication server 120 when performing the method 400 receives a request to authenticate an electronic transaction described by a value of an authentication factor. The authentication server 120 responds by deriving a value of a category from the values of the authentication factors (e.g., country of origin). The authentication server 120 subsequently analyses the transaction data 172 in the storage device 170 to determine information in connection with the value. Here, authentication server 120 performs an analysis comprising a first part and a second part that each include decay factors associated with respective time periods for applying aging to the prior electronic transactions (e.g., decay factor $\alpha=\exp^{-1/d}$). In this particular embodiment, the time periods are different such that the first part may be configured to fast learn/fast forget transaction data while the second part may be configured to slow learn/slow forget transaction data. By virtue of the different time periods, at least one prior electronic transaction, included within the transaction data, may have an age outside a first time window resulting in this transaction being discriminated against and quickly forgotten while the same electronic transaction may be within a second time window resulting in the transaction being remembered for a longer period. Thus, the first and second parts of the analysis performed by the authentication server 120 results in two different profiles. Authentication server 120 may generate an authentication result by determining the risk scores for both profiles and assigning the lowest risk score to the transaction.

In a further example embodiment, the authentication server 120 performs the method 400 in a similar manner to that described above with the main exception being that the authentication server 120 utilises user behaviour profiles over a few different time periods. For example, the transaction data may be arranged in sets or profiles based on the age of respective prior electronic transactions (e.g., prior electronic transactions for last week may be arranged in one profile, prior electronic transactions for last month may be arranged in another profile, etc.). The authentication server 120 may then perform an analysis of the transaction data in the profiles using the first and second parts. By analysing the data in such a manner, the authentication server is able to assign risk scores signifying an anomaly between a current transaction and prior transactions associated with the respective profiles, and assign the lowest of the risk scores to the current transaction. This particular embodiment is a variant of that described above in the previous paragraph.

In a still further embodiment, the authentication server 120 performs the method 400 by utilising profiles and the last risk score per each value for some pre-defined time interval. In one particular embodiment, the authentication server calculates a risk score r for the value of the authentication factor (or category) as described above in connection with other figures by utilising a decay factor, etc. The authentication server also calculates the lowest risk score r_min assigned to the value in the last X days. The authentication server finally determines the new risk score as r_new=min(r, r_min). It should be understood that the learning rate which impacts the raw risk score, r, can be defined such that there can be fast learning and fast forgetting. However, in this embodiment, by remembering the lowest risk score it enables slow forgetting for the system. For example, even if a value receives risky scores due to the fast learning and fast forgetting, the fact that the final score is bounded by r_min means that the system remembers that this value used to be not-risky and this is reflected in the final score. The slow forgetting is applied in this approach through bounding the risk score by previous risk scores.

Figure 5:
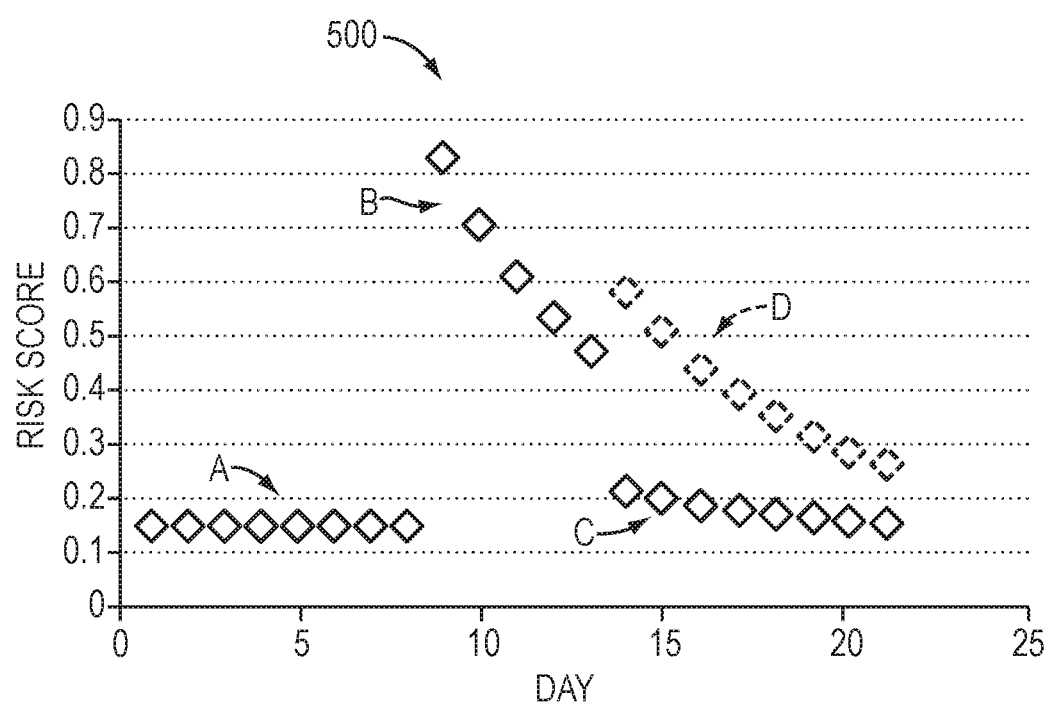
FIG. 5 is a graph illustrating the results of carrying out the method of FIG. 4 within the electronic environment illustrated in FIG. 1.

FIG. 5 is a graph 500 illustrating the results of carrying out the method of FIG. 4 within the electronic environment illustrated in FIG. 1. As illustrated, the graph 500 describes a scenario in which a user interacts with the system from a first country between days 1 and 8 (the series of interactions in this period highlighted in the graph by 'A'). It should be understood from the graph that the electronic transactions associated with the interactions during the period days 1 to 8 are determined to have a low risk score due to the fact that it represents normal behaviour by the user. Subsequently, between days 9 and 13, the user interacts with the system from a new second country (the series of interactions in this period highlighted in the graph by 'B'). In this instance, the system determines a deviation from the user's normal behaviour which typically involves a transaction from the first country. As a result, the risk score on day 9 is determined to be high. However, in the following days, the risk score is reduced each day as the system learns the user's behaviour of interacting from the new second country. On days 14 to 22, the user interacts with the system from the first country again (the series of interactions in this period highlighted in the graph by 'C'). As illustrated by the figure, the system determines a risk score similar to the risk score determined for days 1 to 8. In contrast, it can be seen that if the method 400 was not implemented by the system, the risk score in this period would have been higher by virtue of the system having forgotten the first country (the series of interactions in this period highlighted in the graph by 'D').

Advantageously, the system determines a risk score for the series of interaction highlighted by 'C' similar to the risk score determined for the series of interactions highlighted by 'A'. In this particular embodiment, the system utilises the risk scores from the interactions in days 1 to 8 to remember that the first country was not risky in this period. If the system had not utilised the prior risk scores in this period, the risk scores would have been much higher as the system would have forgotten the behaviour in days 1 to 8 at a similar rate as the system learned about the behaviour in days 9 to 13. However, the system has the advantage of fast learning as provided by the first part and slow forgetting as provided by the second part of the analysing. This approach overcomes the problem of false alerts being issued in connection with authentic transactions because of a temporary change in behaviour.

It should be understood that the above-described improved techniques are directed to significantly more than an abstract idea. For example, the improved techniques are directed to an improvement in an industrial process, namely authenticating electronic transactions. The improved techniques involve the storage of prior transaction data in a storage device such that the data is accessible by category value. Such storage requires nontrivial changes to electronic circuitry and storage to accommodate such an improvement.

While various embodiments of the present disclosure have been particularly shown and described, it will be understood by those skilled in the art that various changes in form and details may be made therein without departing from the spirit and scope of the present disclosure as described by the appended claims.

For example, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 450 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A computer-implemented method, comprising:
   receiving, by processing circuitry, an electronic transaction in connection with a computerized resource, the electronic transaction being described by a particular value of an authentication factor;
   in response to receiving the electronic transaction, determining, by processing circuitry, two separate risk measurements describing the riskiness of the electronic transaction, wherein the two risk measurements comprise a first risk measurement relating to a first time window and a second risk measurement relating to a second time window, the first time window being greater than the second time window, and wherein the determining comprises performing an analysis of transaction data relating to one or more prior electronic transactions in the second time window;

comparing, by processing circuitry, the two risk measurements in order to determine which of the two risk measurements indicates a lower risk;

selecting, by processing circuitry, and from the two risk measurements, the risk measurement with the lower risk;

generating, by processing circuitry, an authentication result based on the selected risk measurement, the authentication result indicating whether the electronic transaction is authentic; and validating, by processing circuitry, the electronic transaction when the authentication result indicates that the electronic transaction is authentic.

2. The method as claimed in claim 1, wherein the transaction data relates to one or more prior electronic transactions associated with a period of time; and determining two separate risk measurements describing the riskiness of the electronic transaction, comprises:

determining a first decay factor;

performing a first analysis of the transaction data by utilising the first decay factor to age prior electronic transactions; and based on the said first analysis, determining a first risk measurement describing the riskiness of the electronic transaction.

3. The method as claimed in claim 2, wherein the first decay factor ages prior electronic transactions at a particular rate; and determining two separate risk measurements describing the riskiness of the electronic transaction, comprises:

determining a second decay factor;

performing a second analysis of the transaction data by utilising the second decay factor to age prior electronic transactions, wherein the second decay factor ages the prior electronic transactions at a slower rate than the particular rate associated with the first decay factor; and based on the said second analysis, determining a second risk measurement describing the riskiness of the electronic transaction.

4. The method as claimed in claim 1, wherein the transaction data is arranged in first and second profiles based on the respective ages of the prior electronic transactions; and determining two separate risk measurements describing the riskiness of the electronic transaction, comprises:

determining a first risk measurement describing the riskiness of the electronic transaction by performing a first analysis in connection with the prior electronic transactions in the first profile; and determining a second risk measurement describing the riskiness of the electronic transaction by performing a second analysis in connection with the prior electronic transactions in the second profile.

5. The method as claimed in claim 1, wherein the transaction data comprises a prior risk measurement previously assigned to a prior electronic transaction including the particular value; and determining two separate risk measurements describing the riskiness of the electronic transaction, comprises:

determining a first risk measurement describing the riskiness of the electronic transaction by performing a first analysis in connection with prior electronic transactions that discriminates against prior electronic transactions based on age; and determining a second risk measurement describing the riskiness of the electronic transaction by retrieving the prior risk measurement.

6. An apparatus, comprising:

memory; and processing circuitry coupled to the memory, the memory storing program code which, when executed by the processing circuitry, cause the processing circuitry to:

receive an electronic transaction, the electronic transaction being described by a particular value of an authentication factor;

in response to receiving the electronic transaction, determine two separate risk measurements describing the riskiness of the electronic transaction, wherein the two risk measurements comprise a first risk measurement relating to a first time window and a second risk measurement relating to a second time window, the first time window being greater than the second time window, and wherein the determining comprises perofmring an analysis of transaction data relating to one or more prior electronic transactions in the second time window;

compare the two risk measurements in order to determine which of the two risk measurements indicates a lower risk;

select, and from the two risk measurements, the risk measurements indicates a lower risk;

generate an authentication result based on the selected risk measurement, the authentication result indicating whether the electronic transaction is authentic; and validate the electronic transaction when the authentication result indicates that the electronic transaction is authentic.

7. The apparatus as claimed in claim 6, wherein the transaction data relates to one or more prior electronic transactions associated with a period of time; and determining two separate risk measurements describing the riskiness of the electronic transaction, comprises:

determining a first decay factor;

performing a first analysis of the transaction data by utilising the first decay factor to age prior electronic transactions; and based on the said first analysis, determining a first risk measurement describing the riskiness of the electronic transaction.

8. The apparatus as claimed in claim 7, wherein the first decay factor ages prior electronic transactions at a particular rate; and determining two separate risk measurements describing the riskiness of the electronic transaction, comprises:

determining a second decay factor;

performing a second analysis of the transaction data by utilising the second decay factor to age prior electronic transactions, wherein the second decay factor ages the prior electronic transactions at a slower rate than the particular rate associated with the first decay factor; and based on the said second analysis, determining a second risk measurement describing the riskiness of the electronic transaction.

9. The apparatus as claimed in claim 6, wherein the transaction data is arranged in first and second profiles based on the respective ages of the prior electronic transactions; and determining two separate risk measurements describing the riskiness of the electronic transaction, comprises:

determining a first risk measurement describing the riskiness of the electronic transaction by performing a first analysis in connection with the prior electronic transactions in the first profile; and determining a second risk measurement describing the riskiness of the electronic transaction by performing a second analysis in connection with the prior electronic transactions in the second profile.

10. The apparatus as claimed in claim 6, wherein the transaction data comprises a prior risk measurement previously assigned to a prior electronic transaction including the particular value; and determining two separate risk measurements describing the riskiness of the electronic transaction, comprises:

determining a first risk measurement describing the riskiness of the electronic transaction by performing a first analysis in connection with prior electronic transactions that discriminates against prior electronic transactions based on age; and determining a second risk measurement describing the riskiness of the electronic transaction by retrieving the prior risk measurement.

11. A computer program product having a non-transitory computer readable medium which stores a set of instructions, the set of instructions, when carried out by processing circuitry, causing the processing circuitry to perform a method, the method comprising:

receiving an electronic transaction, the electronic transaction being described by a particular value of an authentication factor;

in response to receiving the electronic transaction, determining two separate risk measurements describing the riskiness of the electronic transaction, wherein the two risk measurements comprise a first risk measurement relating to a first time window and a second risk measurement relating to a second time window, the first time window being greater than the second time window, and wherein the determining comprises performing an analysis of transaction data relating to one or more prior electronic transactions in the second time window;

comparing the two risk measurements in order to determine which of the two risk measurements indicates a lower risk;

selecting, and from the two risk measurements, the risk measurement with the lower risk;

generating an authentication result based on the selected risk measurement, the authentication result indicating whether the electronic transaction is authentic; and validating the electronic transaction when the authentication result indicates that the electronic transaction is authentic.

12. The computer program product as claimed in claim 11, wherein the transaction data relates to one or more prior electronic transactions associated with a period of time; and determining two separate risk measurements describing the riskiness of the electronic transaction, comprises:

determining a first decay factor;

performing a first analysis of the transaction data by utilising the first decay factor to age prior electronic transactions; and based on the said first analysis, determining a first risk measurement describing the riskiness of the electronic transaction.

13. The computer program product as claimed in claim 12, wherein the first decay factor ages prior electronic transactions at a particular rate; and determining two separate risk measurements describing the riskiness of the electronic transaction, comprises:

determining a second decay factor;

performing a second analysis of the transaction data by utilising the second decay factor to age prior electronic transactions, wherein the second decay factor ages the prior electronic transactions at a slower rate than the particular rate associated with the first decay factor; and based on the said second analysis, determining a second risk measurement describing the riskiness of the electronic transaction.

14. The computer program product as claimed in claim 11, wherein the transaction data is arranged in first and second profiles based on the respective ages of the prior electronic transactions; and determining two separate risk measurements describing the riskiness of the electronic transaction, comprises:

determining a first risk measurement describing the riskiness of the electronic transaction by performing a first analysis in connection with the prior electronic transactions in the first profile; and determining a second risk measurement describing the riskiness of the electronic transaction by performing a second analysis in connection with the prior electronic transactions in the second profile.

15. The computer program product as claimed in claim 11, wherein the transaction data comprises a prior risk measurement previously assigned to a prior electronic transaction including the particular value; and determining two separate risk measurements describing the riskiness of the electronic transaction, comprises:

determining a first risk measurement describing the riskiness of the electronic transaction by performing a first analysis in connection with prior electronic transactions that discriminates against prior electronic transactions based on age; and determining a second risk measurement describing the riskiness of the electronic transaction by retrieving the prior risk measurement.

\* \* \* \* \*